United States Patent [19]

Takahashi et al.

[11] Patent Number: 4,948,165
[45] Date of Patent: Aug. 14, 1990

[54] PROPORTIONING VALVE ASSEMBLY FOR AN ACTIVELY CONTROLLED SUSPENSION SYSTEM

[75] Inventors: Kenro Takahashi; Naohiko Inoue; Masahiro Tsukamoto, all of Kanagawa, Japan

[73] Assignee: Nissan Motor Company, Limited, Yokohama, Japan

[21] Appl. No.: 303,339

[22] Filed: Jan. 26, 1989

[30] Foreign Application Priority Data

Jan. 26, 1988 [JP] Japan .................................. 63-13642
Jan. 29, 1988 [JP] Japan ............................ 63-10554[U]

[51] Int. Cl.$^5$ ...................... B60F 17/00; B60G 11/16
[52] U.S. Cl. .................................................. 280/707
[58] Field of Search ........................ 280/707, 714, 804

[56] References Cited

U.S. PATENT DOCUMENTS

| | | | |
|---|---|---|---|
| 4,185,845 | 1/1980 | Misch et al. | 280/707 |
| 4,364,574 | 12/1982 | Saito | 280/707 |
| 4,573,705 | 3/1986 | Kanai et al. | 280/707 |
| 4,625,993 | 12/1986 | Williams et al. | 280/707 |
| 4,720,490 | 10/1987 | Yamaguchi et al. | 280/707 |
| 4,801,155 | 1/1989 | Fukushima et al. | 280/707 |
| 4,848,790 | 7/1989 | Fukunaga et al. | 280/707 |
| 4,865,348 | 9/1989 | Hano et al. | 280/707 |
| 4,888,696 | 12/1989 | Akatsu et al. | 364/424.05 |

*Primary Examiner*—Richard A. Bertsch
*Attorney, Agent, or Firm*—Foley & Lardner, Schwartz, Jeffery, Schwaab, Mack, Blumenthal & Evans

[57] ABSTRACT

A proportioning valve assembly employs an electromagnetic acuator, such as a proportioning solenoid, associated with a driver circuit. The driver circuit is provided a lead phase circuit for providing a lead phase in supplying a supply current for controlling the valve position of the proportioning valve. Providing appropriate lead time reduces necessity of high gain in attitude change suppression mode operation. Therefore, the response characteristics in pressure adjustment in the shock absorbing mode operation, can be prevented from falling an excessive level.

18 Claims, 10 Drawing Sheets

PROPORTIONING VALVE ASSEMBLY FOR AN ACTIVELY CONTROLLED SUSPENSION SYSTEM

BACKGROUND OF THE INVENTION

1. Field of the Invention

The present invention relates generally to a proportioning valve assembly which is suitable for use in an actively controlled automotive suspension system. More specifically, the invention relates to an electric circuit associated with the proportioning valve for controlling valve position and whereby controlling pressure supplied to a work therefrom. The invention also relates to an actively controlled suspension system which employs the proportioning valve assembly as a pressure control valve for adjusting suspension characteristics to regulate vehicular height and vehicular attitude.

2. Description of the Background Art

U.S. Pat. No. 4,702,490, issued on Oct. 27, 1987, the co-pending U.S. patent applications Ser. Nos. 052,934, 059,888, 061,368, 060,856 and 060,909 respectively filed on May 22, 1987, Jun. 9, 1987, Jun. 15, 1987, Jun. 12, 1987 and Jun. 12, 1987, and all assigned to the common assignee to the present invention disclose actively controlled suspension systems which employ pressure control valves for adjusting pressure in a working chamber of a hydraulic cylinder. The pressure control valve employed in such an actively controlled suspension system defines a pilot chamber and a feedback chamber to which output fluid pressure is fed back from an outlet so as to adjust the fluid pressure to be discharged from the outlet toward the pilot pressure. The pilot pressure is adjusted by an electronic actuator, such as a proportioning solenoid. In the actively controlled suspension system, attitude change suppressive suspension control is performed by adjusting the pilot pressure and whereby adjusting the suspension characteristics between harder suspension characteristics and softer suspension characteristics. Such adjustment is performed by adjusting a position of the valve member associated with the pilot chamber for adjusting the pilot pressure.

On the other hand, the actively controlled suspension system also performed absorption of road shock by absorbing vibration energy input through the vehicular wheel. In such case, the pilot pressure is maintained at a constant value and the pressure control valve serves for allowing introduction and draining of pressurized fluid in the working chamber of the hydraulic cylinder depending upon the pressure difference between the pilot pressure and the supply pressure which reflects the fluid pressure in the working chamber.

In such a suspension control system, substantially high response characteristics in adjusting the fluid pressure in the hydraulic cylinder is required so that a satisfactory response in suppression of the suspension characteristics is achieved according to the vehicle driving condition.

The proportioning solenoid is generally connected to a driver circuit to receive driver current to drive a valve position for adjusting the pilot pressure at a desired pressure. The driver circuit adjusts a supply current toward a target current which is derived on the basis of a suspension control signal input from a control unit. Frequency characteristis of the supply current and the target current are so adjusted to have a linear relationship. In such driver circuit, greater input gain is preferred for obtaining high response characteristics.

On the other hand, for absorption of vibration energy, a hydraulic system in the pressure control valve is preferably provided great input frequency characteristics versus input vibration. To achieve the high input frequency characteristics in absorbing the vibration energy, an orifice is provided in a path establishing communication between the outlet of the pressure control valve and a feedback chamber. This orifice tends to serve as resistance to the fluid flow and effective for providing high response in absorption of the vibration enegy. However, on the other hand, this orifice serves as lag factor for response characteristics in the attitude change suppressive mode operation in which the pilot pressure is controlled according to the driver current.

The relationship between the frequency characteristics versus the input current and the frequency characteristics versus input vibration are shown in FIGS. 12 and 13. Lines A1 and A2 of FIG. 10 shows preferred characteristics of gain (A1) and phase (A2) of input current frequency characteristics. As will be seen herefrom, greater input gain is preferred to obtain high response. On the other hand, lines B1 (gain) and B2 (phase) show prefered characteristics of pressure variation gain and phase of input vibration frequency characteristics. When better response characteristics are obtaining in the input vibration frequency characteristics, the orifice is provided in the feedback path, gain and phase of the input current frequency characteristics varies to that illustrated by lines C1 (gain) and C2 (phase) which show undesirable characteristics. On the other hand, when input current frequency characteristics are set to obtain the characteristics of A1 and A2, the input vibration frequency characteristics becomes that illustrated by lines D1 (gain) and D2 (phase). As will be seen from lines D1 and D2, when the input current frequency characteristics is provided high gain, pressure adjustment function in the shock absoring mode operation becomes excessive, particularly in a relatively low frequency range, to give a rough ride feeling to which degrades riding comfort.

Therefore, in the conventional system, it was difficult to achive satisfactorily high response both in attitude change, suppressing mode operation and shock absorbing mode operation.

SUMMARY OF THE INVENTION

Therefore, is is an object of the present invention to provide a proportioning valve assembly which can achieve satisfactorily high response characteristics.

Another object of the invention is to provide an actively controlled suspension system which can achieve satisfactorily high response both in the attitude change suppression mode operation and shock absorbing mode operation.

In order to accomplish the aforementioned and other objects, a proportioning valve assembly according to the present invention, employs an electromagnetic actuator, such as a proportioning solenoid, associated with a driver ciurcuit. The driver circuit is provided a lead phase circuit for providing a lead phase in supplying a supply current for controlling the valve position of the proportioning valve. Providing appropriate lead time reduces the necessity of high gain in the attitude change suppression mode operation. Therefore, the response characteristics in pressure adjustment in the shock absorbing mode operation can be prevented from falling in an excessive level.

According to one aspect of the invention, a proportioning valve assembly disposed between a pressurized fluid source and a hydraulic cylinder for adjusting fluid pressure in a working chamber in the hydraulic cylinder, the proportioning valve assembly operating in a first mode in response to vibration energy for absorbing vibration energy for maintaining the fluid pressure in the working chamber and in a second mode for adjusting the fluid pressure in the working fluid for varying characteristics of the hydraulic cylinder work, includes: a valve housing defining a first port connected to a pressurized working fluid source to receive pressurized working fluid therefrom, a second port connected to the pressurized working fluid source for returning the working fluid thereto, and a third port connected to a hydraulic cylinder for fluid communication therewith for adjusting working fluid pressure in the work; a first valve means having one end facing a first chamber to be exerted a pilot pressure representative of a desired pressure in hydraulic cylinder and the other end facing a second chamber to be exerted a feedback pressure which is fed back from the third port, the first valve body being movable according to pressure difference between pilot pressure and the feedback pressure for selectively establishing fluid communication between the the first, second and third ports of the valve housing, the first valve body solely operative in response to a pressure difference between the pilot pressure and the feedback pressure for maintaining the fluid pressure in the working chamber constant at the pressure of the first chamber in the first mode; a fluid path means defining a fluid path extending from the first port to the first chamber and from the first chamber to the second port; a second valve means associated with the fluid path for providing flow restriction at a predetermined magnitude for generating the pilot pressure within the first chamber, the second valve means being operative in the second mode for adjusting the pilot pressure, and the second valve means including an electically operable actuator means for recieving a control signal to drive a valve member at a position corresponding to a value of the control signal for adjusting the pilot pressure at a pressure corresponding to the control signal value; and an electric circuit means for supplying the control signal to the actuator of the second valve means, the electric circuit means including means for causing phase advance compensating lag in the first valve means in response to variation of the pilot pressure in the second mode operation.

According to another aspect of the invention, a proportioning valve assembly includes: a valve housing defining a first port connected to a pressurized working fluid source to receive pressurized working fluid therefrom, a second port connected to the pressurized working fluid source for returning the working fluid thereto, and a third port connected to a hydraulic cylinder for fluid communication therewith for adjusting working fluid pressure in the work; a first valve body having one end facing a first chamber to be exerted a pilot pressure representative of a desired pressure in the work and the other end facing a second chamber to be exerted a feedback pressure which is fed back from the third port, the first valve body being movable according to the pressure difference between the pilot pressure and the feedback pressure for selectively establishing fluid communication between the the first, second and third ports of the valve housing; a fluid path means defining a fluid path extending from the first port to the first chamber and from the first chamber to the second port; a second valve means associated with the fluid path for providing flow restriction at a predetermined magnitude for generating the pilot pressure within the first chamber; a first flow restricting means providing in a fluid path connecting the third port and the feedback chamber for restricting fluid flow therethrough; and a driver circuit connected to the second valve for driving the second valve means to desired valve position for adjusting the valve pressure, the driver circuit including a circuit component for compensating phase delay caused by the flow restriction by the first flow restricting means.

According to a further aspect of the invention, an actively controlled suspension system includes: a hydraulic cylinder disposed between a vehicular body and a suspension member rotatably supporting a vehicular wheel, the hydraulic cylinder defining an internal space disposed therein a piston associated with on of the vehicular body and the suspension member via a piston rod, the piston defining a working chamber variable of pressure for varying suspension characteristics; a hydraulic circuit connecting a pressurized working fluid source to the working chamber, the hydraulic circuit including a first line connected to a outlet of the pressurized working fluid source, a second line connected to an inlet of the pressurized working fluid source for returning working fluid therethrough, and a third line connected to the working chamber; a proportioning valve assembly disposed between a pressurized fluid source and a hydraulic cylinder for adjusting fluid pressure in a working chamber in the hydraulic cylinder, the proportioning valve assembly operating in a first mode in response to vibration energy for absorbing vibration enegy for maintaining the fluid pressure in the working chamber and in a second mode for adjusting the fluid pressure in the working fluid for varying characteristics of the hydraulic cylinder, including a valve housing defining a first port connected to a pressurized working fluid source to receive pressurized working fluid therefrom, a second port connected to the pressurized working fluid source for returning the working fluid thereto, and a third port connected to a hydraulic cylinder for fluid communication therewith for adjusting working fluid pressure in the hydraulic cylinder. A first valve means having one end facing a first chamber to be exerted a pilot pressure representative of a desired pressure in the hydraulic cylinder and the other end facing a second chamber to be exerted a feedback pressure which is fed back from the third port, the first valve body being movable according to pressure difference between pilot pressure and the feedback pressure for selectively establishing fluid communication between the first, second and third ports of the valve housing, the first valve body solely operative in response to a pressure difference between the pilot pressure and the feedback pressure for maintaining the fluid pressure in the working chamber constant at the pressure of the first chamber in the first mode; a fluid path means defining a fluid path extending from the first port to the first chamber and from the first chamber to the second port; a second valve means associated with the fluid path for providing flow restriction at a predetermined magnitude for generating the pilot pressure within the first chamber, the second valve means being operative in the second mode for adjusting the pilot pressure, and the second valve means including an electrically operable actuator means receiving a control signal to drive a valve member at a position corresponding to a value of the control signal for adjusting the pilot pressure at a pressure corresponding to the control signal value; and an electric circuit means for supplying the control signal to the actuator of the second valve means, the electric circuit means including means for causing phase advance compensating lag in the first valve means in response to variation of the pilot pressure in the second mode operation; an actuator associated with the second valve means for controlling position of the second valve means for adjusting the pilot pressure at a desired value; and control means for monitoring vehicular attitude change of the vehicular body for producing a control signal depending upon monitored magnitude of attitude change for suppressing the attitude change, the control means supplying the control signal to the actuator for operating the latter to adjust the position of the second valve means.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
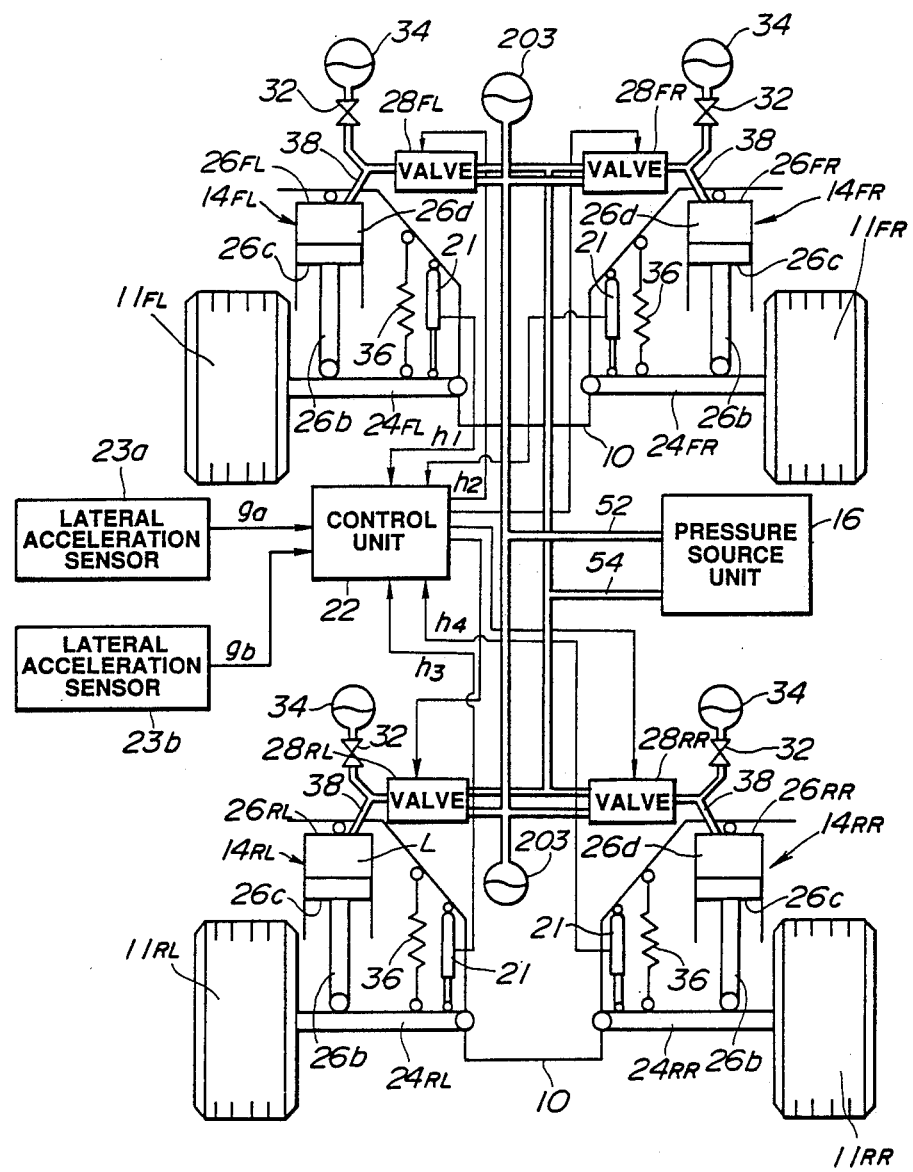
FIG. 1 is a diagrammatical illustration of the overall construction of the preferred embodiment of an actively controlled suspension system, according to the present invention, in which the preferred embodiment of a proportioning valve assembly is employed as a pressure control valve.

Referring now to the drawings, particularly to FIG. 1, the preferred embodiment of an actively controlled suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14" Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinders 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

Figure 3:
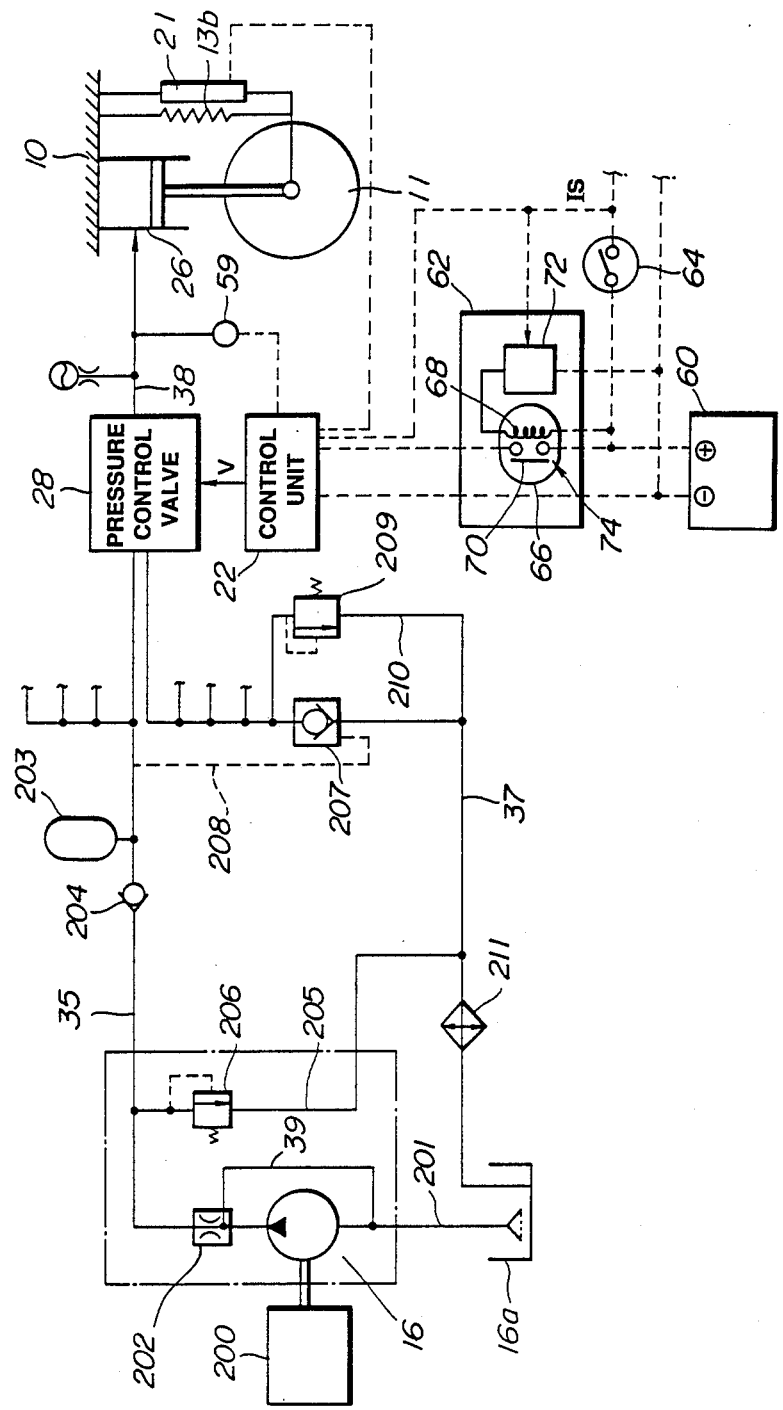
FIG. 3 is a circuit diagram of one example of hydraulic circuit which is applicable for the actively controlled suspension system according to the present invention.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37 (FIG. 3). A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected to a plurality of vehicular height sensors 21 which are disposed in respectively the associated suspension mechanism and designed for monitoring the relative position of the vehicular body 10 and the relevant suspension member 24 to produce a vehicular height level indicative signals $h_1$, $h_2$, $h_3$ and $h_4$. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_y$ is generated by the lateral acceleration sensor, a longitudinal acceleration indicative signal $G_x$ is generated by the longitudinal acceleration sensor, and so forth, the control unit performs anti-rolling, anti-pitching and bouncing suppressive suspension controls.

With the specific sensors such as the vehicle height sensors which comprise the strike sensor, the lateral acceleration sensor 23 and the longitudinal acceleration sensor 25, it is possible to replace or add any other sensors which monitor vehicle driving parameters associated with the suspension control. For instance, the stroke sensors employed in the shown embodiment can be replaced with one or more vertical acceleration sensors. Similarly, the lateral acceleration sensor may be replaced with a steering angle sensor for monitoring steering behaviour for assuming lateral force to be exerted on the vehicular body. In the later case, the parameter indicative of the steering angular displacement may be used in combination of a vehicular speed data since vehicular speed may influence for rolling magnitude of the vehicle during steering operation.

Figure 2:
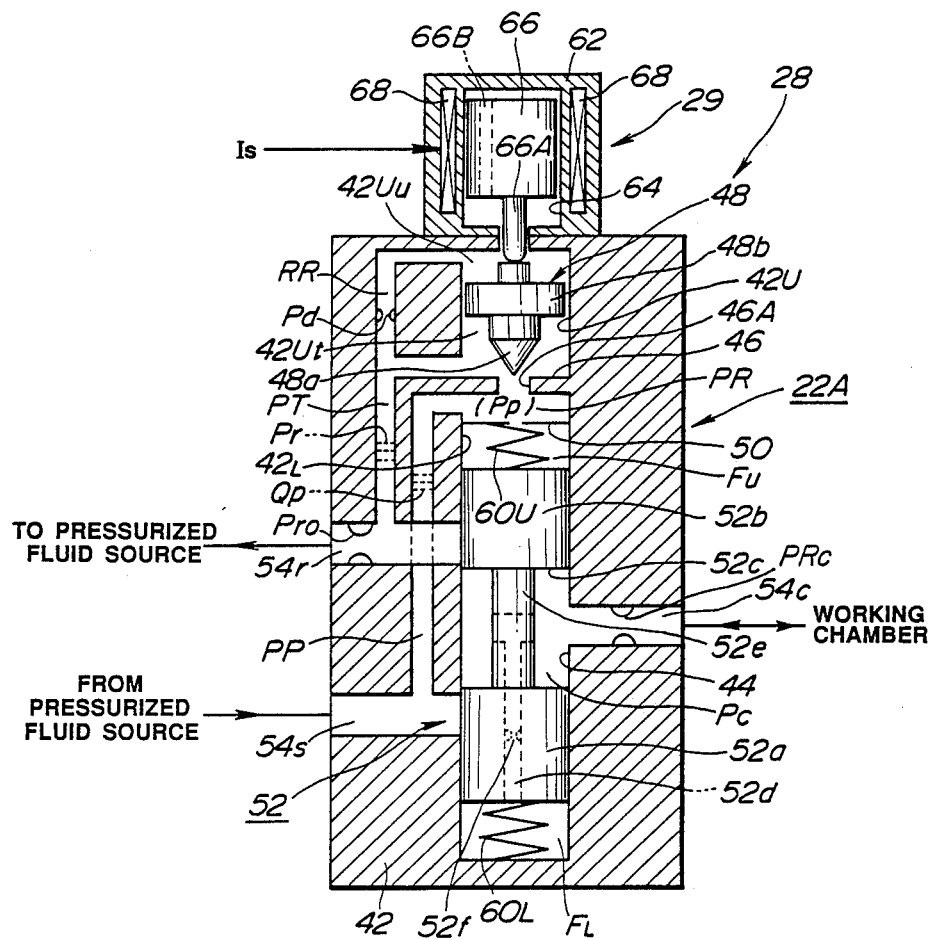
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of the introduction and draining of pressurized fluid into and from the working chamber 26d for adjusting the pressure in the working chamber. As will be appreciated, since the adjusted fluid pressure in the working fluid determines the damping force to be created in response to relative displacement between the vehicle body 10 and the suspension member 24, the mode of the suspension mechanism is varied according to the variation of the fluid pressure in the working chamber between a predetermined hardest mode to a most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining where partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exert spring force to the valve spool 52 for resiliently restricting movement of the latter. Resilient force of the offset springs 60U and 60L are so set as to balance to place the valve spool 52 at a neutral position, when the fluid pressure in the upper and lower feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Prc is also provided in the pressure control port 54c for restricting fluid flow therethrough. The diameter of the fluid path at the orifice Prc is so selected as to create great flow restriction against pulsatile fluid flow cyclically varying the fluid pressure at a frequency approximately 1 Hz.

FIG. 3 shows detailed circuit construction of one example of hydraulic circuit which is applicable for the shown embodiment of the actively controlled suspension system, according to the present invention. The pressure source unit includes the pressure unit 16 which comprises a fluid pump, and is connected to a fluid reservoir 16a via a suction pipe 201 The fluid pump 16 is associated with an automative engine 200 so as to be driven by the output torque of the latter. The outlet of the pressure unit 16, through which the pressurized working fluid is discharged, is connected to the supply port 54s of the pressure control valve 28 via the supply line 35. A pressure regulating orifice 202 is disposed in the supply line 35 for suppressing pulsatile flow of the working fluid and whereby regulate the output pressure of the pressure unit 16 to be delivered to the pressure control valve 28. A feedback line 39 is connected to the upstream of the pressure regulating orifice 202 at one end. The other end of the feedback line 39 is connected to the upstream of the inlet of the pressure unit 16 and the orifice excessive fluid between the pressure unit 16 and the orifice 202 is fed back to the inlet side of the pressure unit.

A pressure accumulator 203 is also connected to the supply line 35 to receive therefrom the pressurized fluid for accumulating the pressure. An one-way check valve 204 is disposed in the supply line 35 at the position upstream of the junction between the pressure accumulator 203 and the supply line 35.

A pressure relief line 205 is also connected to the supply line 35 at the position intermediate between the pressure regulating orifice 202 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a given value to drain port of the working fluid to the drain line for maintaining the pressure in the supply line 35 below the given pressure value.

On the other hand, a shut-off valve 207 is disposed in the drain line 37. The shut-off valve 207 is also connected to the supply line 35 at upstream of the one-way check valve 204 to receive therefrom the pressure in the supply line as a pilot pressure, via a pilot line 208 (shown in plantom). The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 37 may flow therethrough to the reservoir tank 16a. On the other hand, the shut-off valve 207 is responsive to the pilot pressure drops below the given pressure level to be switched into shut-off position. At the shut-off position, the shut-off valve blocks fluid communication between the drain port 54r of the pressure control valve 28 and the reservoir tank 16a.

In parallel to the shut-off valve 207, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 37 upstream thereof, higher than a set pressure, e.g. 30 kgf/cm$^2$, in order to establish fluid communication between the upstream side and the dowstream side of the shut-off valve 207 to allow the excessive pressure at the upstream side drain line 37 to be drained therethrough. Therefore, the pressure relief valve 209 limits maximum pressure at the set pressure. The set pressure of the pressure relief valve 209 corresponds to a predetermined offset pressure.

An oil cooler 211 is disposed in the drain line 37 for cooling the working fluid returning to the reservoir tank 16a.

In the hydraulic circuit set forth above, the fluid is pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and is introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the shut-off valve 207 via a pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the shut-off valve 207 and the oil cooler 211.

The shut-off valve 207, even at the open position, serves as a resistance to the fluid flow. Therefore, the fluid pressure in the drain line 37 upstream of the shut-off valve 207 becomes higher, i.e. higher than the offset pressure $P_O$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to drop of the pressure in the supply line 35, the pilot pressure to be exerted to the shut-off valve 207 via the pilot line 208 drops. When the pressure in the pilot line 208 drops below or equal to the set pressure, the shut-off valve 207 is switched into shut-off position to block fluid communication therethrough. As a result, the fluid pressure in the drain line 37 upstream of the shut-off valve 207 becomes equal to the pressure in the working chamber 26d. Therefore, even when the working fluid leaks through a gap between the spool valve 52 and the inner periphery of the valve bore, it does not affect the fluid pressure in the working chamber.

Figure 4:
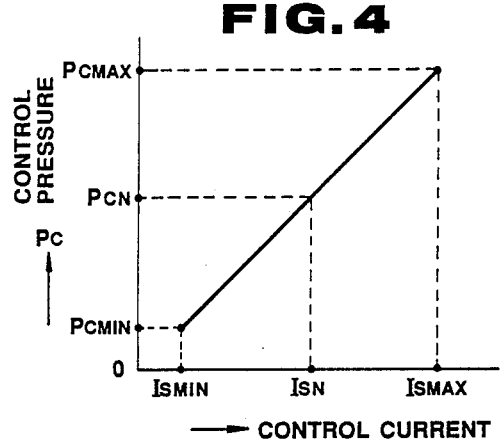
FIG. 4 is a chart showing the relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current $I_n$ is set at an intermediate value between the maximum and minimum current values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm².

When the vehicle steadily travels on a smooth straight road, the current value of the control signal to be applied to the actuator 29 of the pressure control valve 28 is maintained at the neutral value $I_n$. As long as the neutral value $I_n$ of the control signal is applied to the actuator 29, the proportioning solenoid coil 68 is energized at a magnitude corresponding to the neutral value $I_n$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_P$ within the pilot chamber PR is maintained at the neutral pressure $P_n$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_n$.

At this condition, when relatively high frequency and a small magnitude road shock inputs through the vehicular wheel, it is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure $P_P$ in the pilot chamber RP. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure $P_P$ in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During 'the pressure adjusting operation set forth above, the fixed throttling orifice Prc serves for restricting fluid flow from the pressure control port 54c to the drain line 37. This flow restriction at the orifice Prc serves as resistance against the rebounding stroke of the piston 26c to dampen or absorb energy causing rebounding motion of the vehicle body. Furthermore, as set out, working fluid in the pilot chamber PR is generally introduced through the pilot path PP via the multi-stage orifice Qp and returned through the pilot return path PT via the lower section 42Ul of the control chamber 42U and via the multi-stage orifice Pr. As long as the fluid flow in the pilot return path PT is not disturbed and thus steady. The most upstream side orifice Pr' is mainly effective for restricting the fluid flow. Therefore, the magnitude of flow restriction is relatively small so as to provide sufficient response characteristics in reduction of the pilot pressure. On the other hand, when the working fluid flowing from the control chamber 42U confluences with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr are effective to create greater flow restriction that than for the steady flow. This avoids influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted cn the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and decreased across the neutral value $I_n$.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_n$, and the control current for the actuator of the pressure control valves 28 controlling the fluid pressures in the front-left and rear-left hydraulic cylinders 26FL and 26RL are to be decreased to be smaller than the neutral current $I_n$. By the control current supplied to respective actuators 29, the proportioning solenoid coils 68 are energized at the magnitudes corresponding to the control signal currents to place the poppet valves 48 at respective corresponding positions. By varying the positions of the poppet valves 48, the flow restriction magnitude at the respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Figure 5:
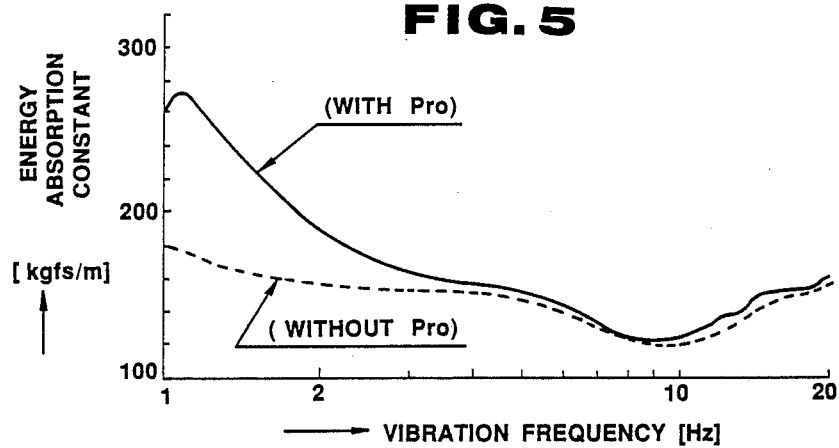
FIG. 5 is a chart showing the relationship between a frequency of road shock and a road shock absorbing constant.
Figure 6:
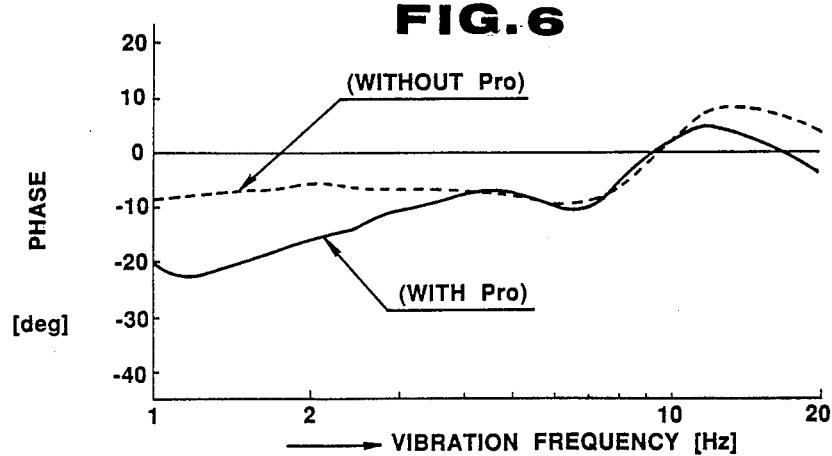
FIG. 6 is a chart showing the relationship between a frequency of road shock and phase.

FIGS. 5 and 6 show variations of the bounding and rebounding energy absorption constant (kgfs/m) and phase (degree) in relation to the vibration frequency. In FIGS. 5 and 6, solid lines shows variation characteristics of the bounding and rebounding energy absorption constant and phase when the orifice Prc is provided and the broken line shows the variation characteristics when the orifice Prc is not provided. As can be seen from FIG. 4, when the orifice Prc is provided, a greater bounding and rebounding energy absorption constant than that having no orifice at the drain port can be obtained particularly in a frequency range of 1 to 2 Hz which corresponds to the resonance frequency of the vehicular body. With this vibration absorbing characteristics provided for the suspension system, substantial reduction of vibration energy to be transmitted to the vehicle body can be achieved. Therefore, with the shown embodiment, substantial improvement of riding comfort of the vehicle can be accomplished.

On the other hand, when the orifice Prc is provided, substantial phase shift is observed in the vibration frequency band approximately corresponding to the resonance range of the vehicle body. However, in relatively low frequency ranges, phase shift will not cause substantial degradation of suspension performance. On the other hand, as seen from FIG. 5, since the phase shift in the high frequency range is equivalent to that having no orifice Pro, influence of the phase shift will be the equivalent level to that without orifice Prc.

As will be appreciated herefrom, the shown embodiment can achieve substantial improvement by providing the orifice Prc in the drain port of the pressure control valve.

In the meanwhile, the multi-stage orifices Pr in the pilot return path PT and the multi-stage orifice Qp in the pilot path PP are effective for avoiding disturbance of the pilot pressure Pp in the pilot chamber PR even when back pressure is subject to the fluid flowing through the drain port for causing disturbance of fluid flow.

Figure 7:
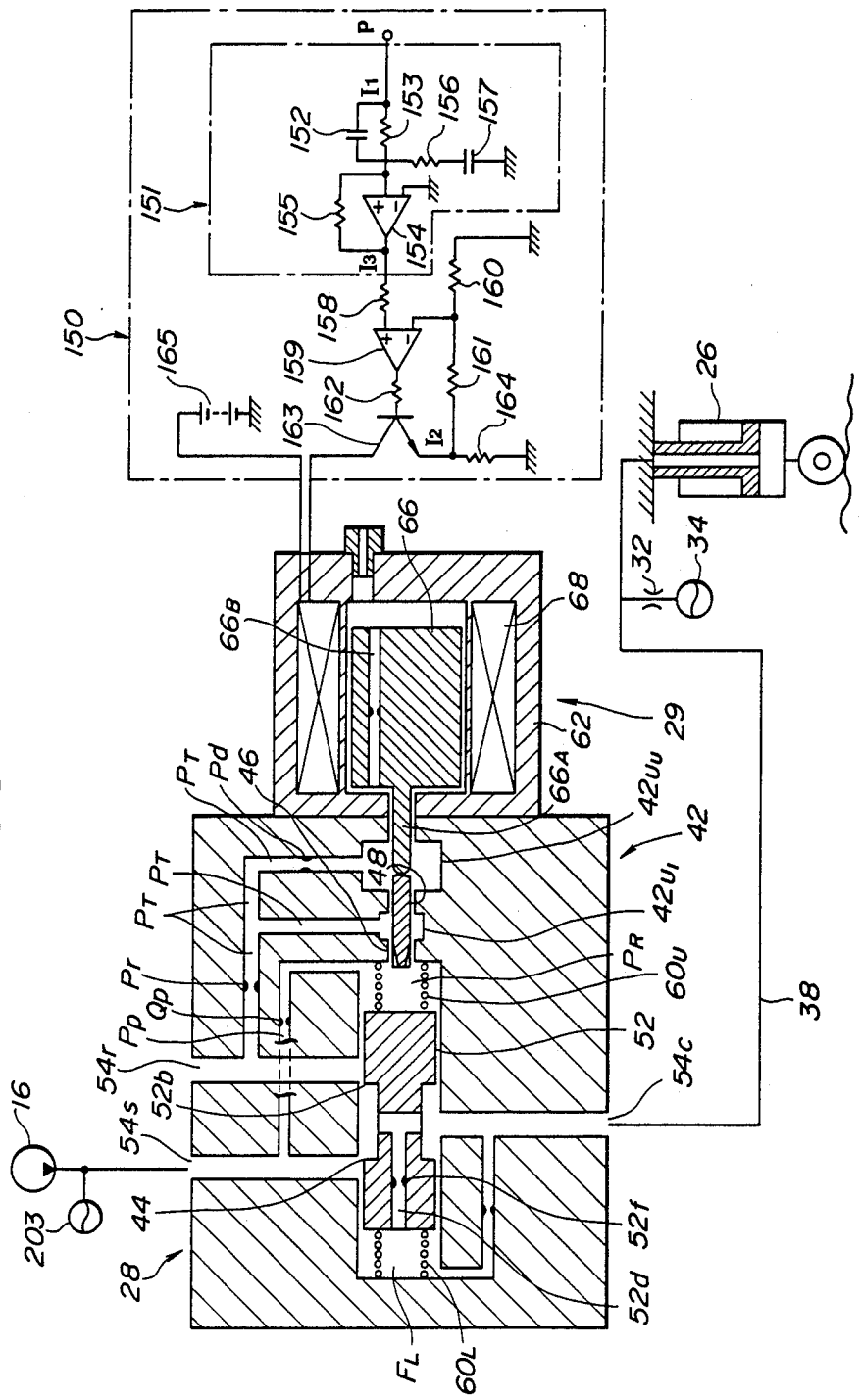
FIG. 7 is an illustration of the preferred embodiment of the pressure control valve of FIG. 1, which is illustrated in a form coupled with the preferred embodiment of a driver circuit for adjusting valve position.

FIG. 7 shows the shown embodiment of the pressure control valve 28 as associated with the preferred embodiment of the driver circuit 150 employed for controlling the operation of the proportioning solenoid valve. The driver circuit 150 is connected to the solenoid coil 68 of the actuator assembly 29. The driver circuit 150 includes a phase advance circuit 151. The phase advance circuit 151 comprises a capacitor 152 and a resistor 153 arranged in parallel relationship to each other with respect to an input terminal P. The parallel circuit of the capacitor 152 and the resistor 153 is connected to a differential amplifier 154 and a parallel resistor 155. A series circuit of a resistor 156 and a capacitor 157 is connected between the differential amplifier 154 and the junction of the parallel circuit of the capacitor 152 and the resistor 153. This series circuit is connected to the ground. The output of the phase advance circuit 151 is connected to a differential amplifier 159 via a resistor 158. The differential amplifier 159 has the other input terminal connected to a junction between resistors 160 and 161. The output of the differential amplifier 159 is connected to the base electrode of a transistor 163 via a resistor 162. The emitter electrode of the transistor 163 is connected to a junction between the resistor 161 and a resistor 164 which is connected to the ground at the other end. The collector electrode of the transistor 163 is connected to a power source battery 165 via the solenoid coil 68.

Figure 11:
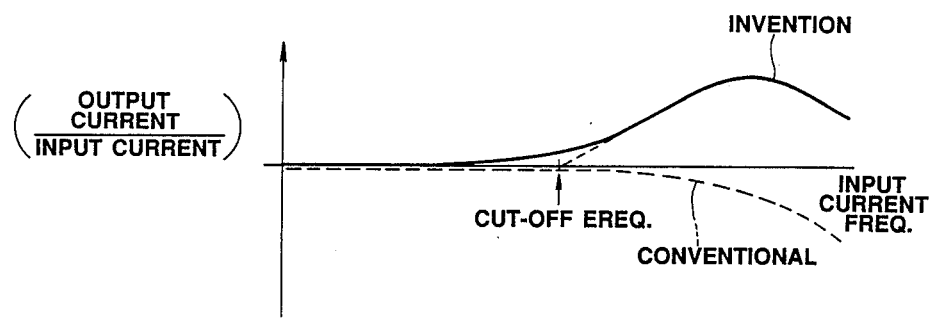
FIG. 11 is a chart showing frequency characteristics of phase in relation to input current.
Figure 12:
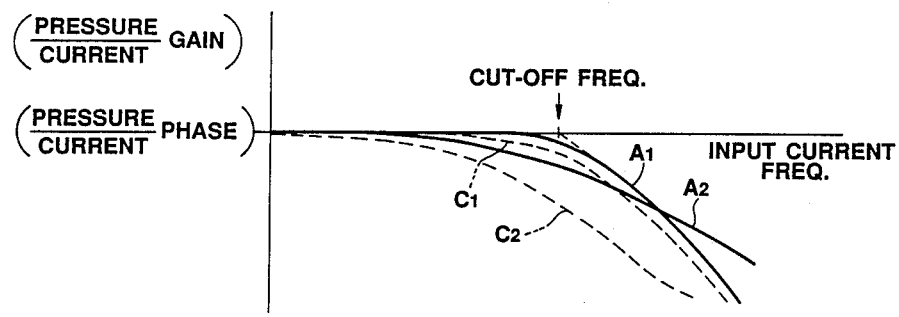
FIG. 12 is a chart showing frequency characteristics of phase and gain in relation to input current.
Figure 13:
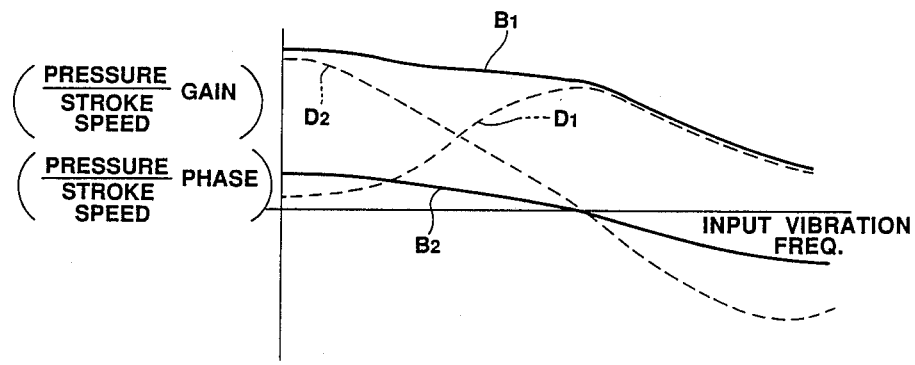
FIG. 13 is a chart showing frequency characteristics of pressure variation gain and phase in relation to vibration input.

The driver circuit 150 set forth above operates in the following manner. In response to vehicular body attitude change indicative input, the control unit 22 outputs the suspension control signal. The control signal is supplied in a form of a current signal having a current value representative of the desired magnitude of the pilot pressure. The current value of the control signal will be hereafter referred to as a "target current $I_1$". The target current $I_1$ is supplied to the non-inverting input terminal of the differential amplifier 154 of the phase advance circuit 151 through the input terminal P and the parallel circuit of the capacitor 152 and the resistor 153. Output of the differential amplifier 154 is fed back through the feedback resistor 155. The fed back output is summed with the input current at the summing junction connected to the non-inverting input terminal. As a result, phase of the output $I_3$ of the differential amplifier 154 is caused a phase shift in the advancing direction as shown in FIG. 11. The phase advanced output current $I_3$ of the differential amplifier 154 is fed to the non-inverting input terminal of the differential amplifier 159. The output of the differential amplifier 159 is supplied to the base electrode of the transistor 163. This causes rising of the potential at the base electrode across the potential at the emitter electrode to cause the transistor turning ON. Therefore, the current corresponding to the current value $I_3$ is applied to the solenoide coil 68 to energize the latter. Therefore, the solenoid coil 68 is energized by the current with a primary lead phase.

Here, the current $I_2$ actually flowing through the solenoid coil at the can be detected as a terminal voltage at the resistor 164. Therefore, by connecting the resistor 164 to the inverting input terminal of the differential amplifier 159 via the resistor 161, the current values $I_3$ and $I_2$ can be compared and adjusted toward the current value $I_3$.

As will be appreciated herefrom, the preferred embodiment of the driver circuit as employed in the preferred embodiment of the actively controlled suspension system can successfully compensate delay in the phase which is cause by providing the orifice 52f in the feedback path.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 8:
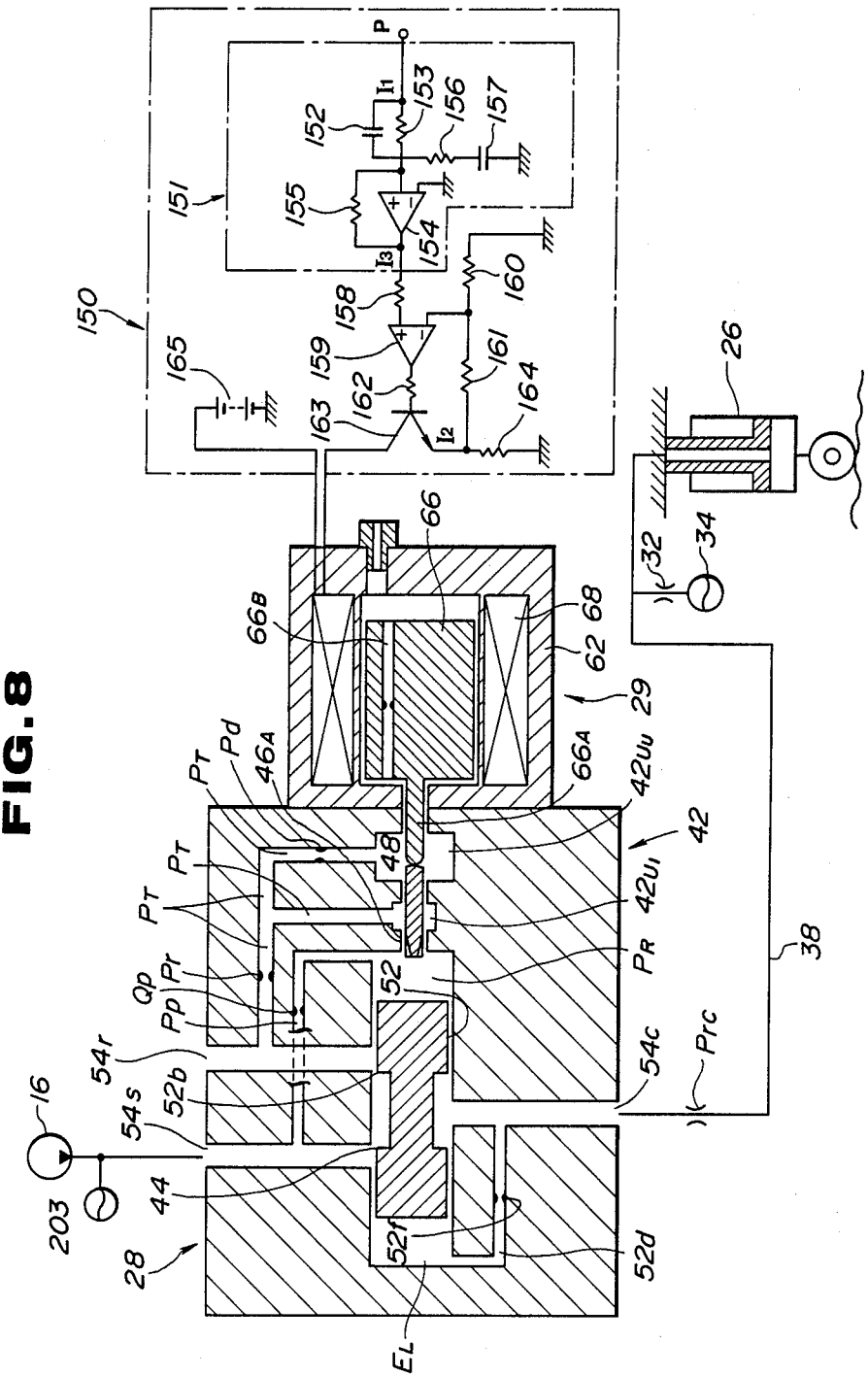
FIG. 8 is an illustration of a modified embodiment of the pressure control valve of FIG. 1, which is illustrated in a form coupled with the preferred embodiment of a driver circuit for adjusting valve position.
Figure 9:
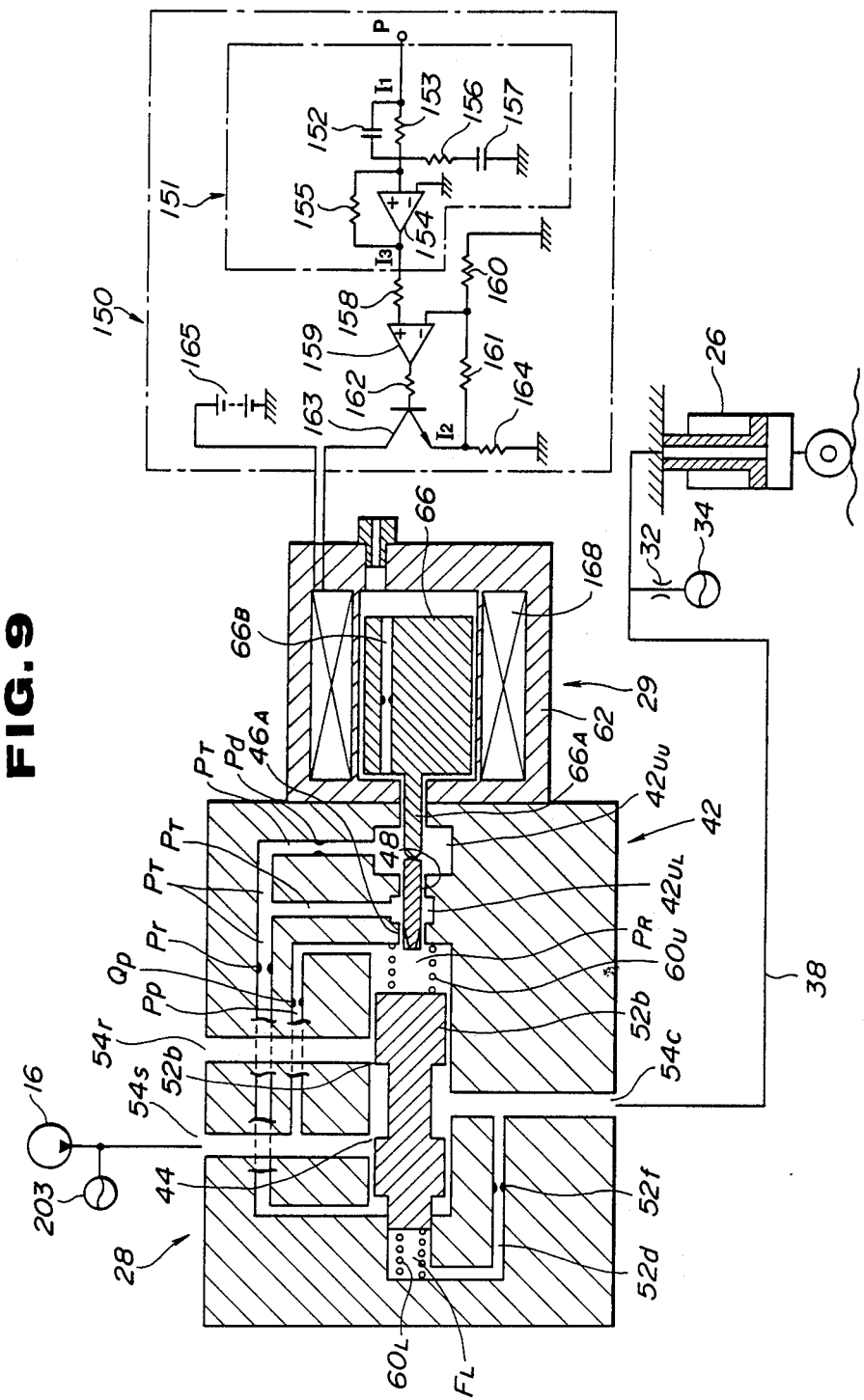
FIG. 9 is an illustration of another modified embodiment of the pressure control valve of FIG. 1, which is illustrated in a form coupled with the preferred embodiment of a driver circuit for adjusting valve position.
Figure 10:
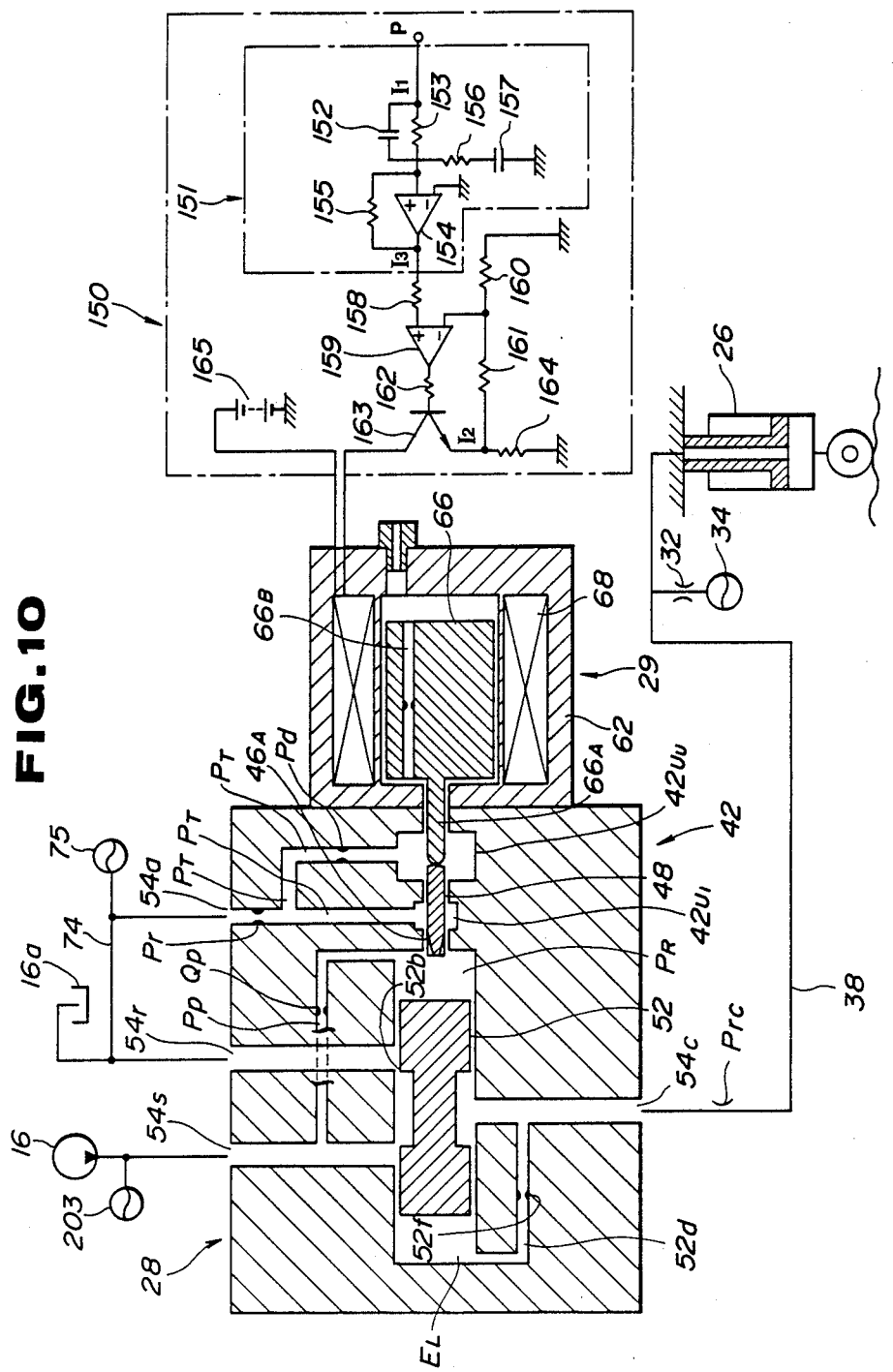
FIG. 10 is an illustration of a further modified embodiment of the pressure control valve of FIG. 1, which is illustrated in a form coupled with the preferred embodiment of a driver circuit for adjusting valve position.

FIGS. 8 to 10 shows variations of constructions of the pressure control valve to be employed in the preferred embodiment of the activly controlled suspension system. In the embodiment of FIG. 8, the offset springs 60U and 60L in the former embodiment are neglected. This embodiment makes the valve spool 52 to be shifted more easily than that of the former embodiment in response to the pressure difference between the pilot chamber PR and the feedback chamber FL. Therefore response characteristics in the shock absorbing mode become higher than that in the former embodiment.

In the embodiment of FIG. 9, the effective area (cross sectional area) of the feedback chamber FL is set smaller than that of the pilit chamber PR. In comformance to this, the effective area of the valve spool 52 facing the feedback chamber FL is made smaller than that subjecting the pilot chamber. In addition, the offset spring 60L is provided greater spring force to that of the offset spring 60U. In this embodiment, assuming the spring force of respective offset springs are Fu and Fl, the pilot pressure Pp and the control pressure Pc can be illustrated by the following equations:

$$Pc = (Ap/Af) \times Pp - (Fl - Fu)/Af$$

where
Af is the effective area of the valve spool facing the feedback chamber; and
Ap is the effective area of the valve spool facing the pilot chamber.

Figure 14:
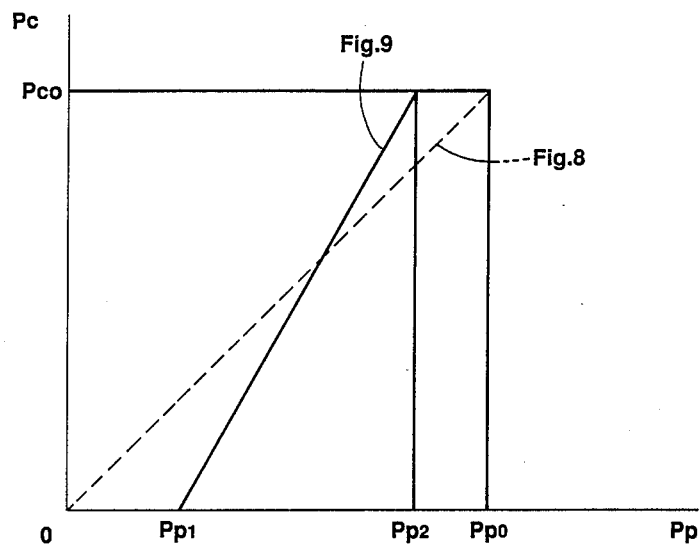
FIG. 14 is a chart showing relationship between pilot pressure and control pressure to be generated in the embodiment of FIG. 9.
Figure 15:
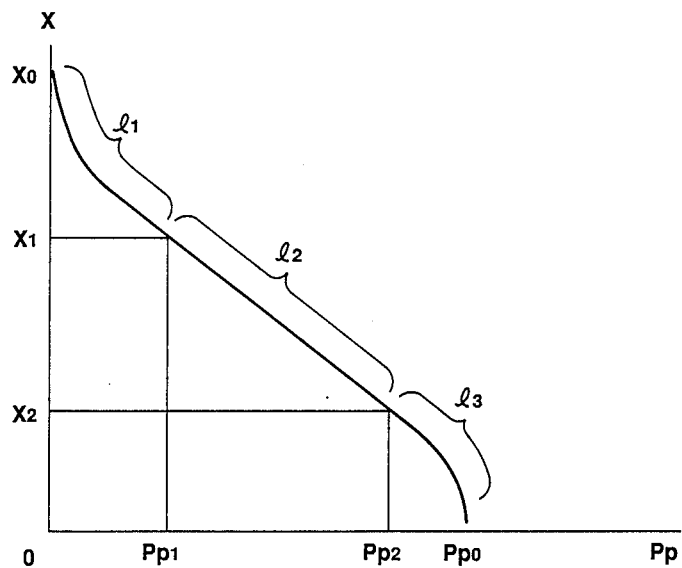
FIG. 15 is a chart showing relationship between pilot pressure and magnitude of displacement of poppet valve utilized as a pilot pressure adjusting valve.

In this case, the relationship between the control pressure Pc and the pilot pressure Pp becomes as that illustrated by the solid line in FIG. 14. This is compared with the control pressure variation characteristics versus the pilot pressure in the embodiment of FIG. 8, which is illustrated by a broken line in FIG. 14. Here, the pilot pressure Pp is so related as to the valve stroke X of the poppet valve as illustrated in FIG. 15. Therefore, while the poppet valve in the embodiment of FIG. 8 is required to stroke between 0 to $X_0$ to vary the pilot pressure between 0 to $Pp_0$, the poppet valve in the embodiment of FIG. 9 is required to stroke between $X_1$ to $X_2$ as shown in FIG. 15.

Therefore, valve strokes $X_1$ and $X_3$ which are part of the valve stroke in the embodiment of FIG. 8, become unnecessary and only valve stroke $X_2$ is required.

FIG. 10 shows a modification of FIG. 8, in which auxiliary drain port 54a connecting the upper and lower sections of the control chamber 42U to the drain line 37 is provided. The auxiliary drain port 54a is connected to a communication line 74 to which a pressure accumulator 75 is provided. In this embodiment, the accumulator 75 absorbs the back pressure created in the drain port 54r thus avoiding the influence of the back pressure for the pilot pressure Pp in the pilot chamber.

What is claimed is:

1. A proportioning valve assembly disposed between a pressurized fluid source and a hydraulic cylinder for adjusting fluid pressure in a working chamber in said hydraulic cylinder, said proportioning valve assembly operating in a first mode in response to vibration energy for absorbing vibration energy for maintaining said fluid pressure in said working chamber and in a second mode for adjusting said fluid pressure in said working fluid for varying characteristics of said hydraulic cylinder, comprising:

a valve housing defining a first port connected to a pressurized working fluid source to receive pressurized working fluid therefrom, a second port connected to said pressurized working fluid source for returning the working fluid thereto, and a third port connected to a work for fluid communication therewith for adjusting working fluid pressure in said work;

a first valve means having one end facing a first chamber to be exerted a pilot pressure representative of a predetermined pressure in said hydraulic cylinder and the other end facing a second chamber to be exerted a feedback pressure which is fed back from said third port, said first valve body being movable according to pressure difference between pilot pressure and said feedback pressure for selectively establishing fluid communication between said first, second and third ports of said valve housing, said first valve body solely operative in response to a pressure difference between said pilot pressure and said feedback pressure for maintaining said fluid pressure in said working chamber constant at the pressure of said first chamber in said first mode;

a fluid path means defining a fluid path extending from said first port to said first chamber and from said first chamber to said second port;

a second valve means associated with said fluid path for providing flow restriction at a predetermined magnitude for generating said pilot pressure within said first chamber, said second valve means being operative in said second mode for adjusting said pilot pressure, and said second valve means including an electrically operable actuator means receiving a control signal to drive a valve member at a position corresponding to a value of said control signal for adjusting said pilot pressure at a pressure corresponding to said control signal value; and an electric circuit means for supplying said control signal to said actuator of said second valve means, said electric circuit means including means for causing phase advance compensating lag in said first valve means in response to a variation of said pilot pressure in said second mode operation.

2. A proportioning valve assembly as set forth in claim 1, wherein said second chamber of said valve housing is connected to said third port via a feedback chamber via a flow restricting orifice.

3. A proportioning valve assembly as set forth in claim 2, wherein said phase advancing means causes phase advance for compensating lag in said first valve means by said flow restricting orifice.

4. A proportioning valve assembly as set forth in claim 1, wherein said phase advancing means includes an input terminal to receive a signal representative of a target pilot pressure indicative signal and produce an output with advanced phase.

5. A proportioning valve assembly comprising:

a valve housing defining a first port connected to a pressurized working fluid source to receive pressurized working fluid therefrom, a second port connected to said pressurized working fluid source for returning the working fluid thereto, and a third port connected to hydraulic cylinder for fluid communication therewith for adjusting working fluid pressure in said hydraulic cylinder;

a first valve body having one end facing a first chamber to be exerted a pilot pressure representative of a desired pressure in said hydraulic cylinder and the other end facing a second chamber to be exerted a feedback pressure which is fed back from said third port, said first valve body being movable according to pressure difference between pilot pressure and said feedback pressure for selectively establishing fluid communication between said first, second and third ports of said valve housing;

a fluid path means defining a fluid path extending from said first port to said first chamber and from said first chamber to said second port;

a second valve means associated with said fluid path for providing flow restriction at a predetermined magnitude for generating said pilot pressure within said first chamber;

a first flow restricting means providing in a fluid path connecting said third port and said feedback chamber for restricting fluid flow therethrough; and a driver circuit connected to said second valve for driving said second valve means to a desired valve position for adjusting the valve pressure, said driver circuit including a circuit component for compensating phase delay caused by said flow restriction by said first flow restricting means.

6. A proportioning valve assembly as set forth in claim 5, wherein a second flow restricting means is provided in said fluid path at a position downstream of said first chamber for restricting fluid flow therethrough, said flow restricting means having a flow restriction characteristics to serve for a first smaller flow restriction for steady fluid flow and for a second greater flow restriction for disturbed fluid flow.

7. A proportioning valve assembly as set forth in claim 6, wherein said second flow restricting means comprises a multi-stage orifice having a plurality of strip-like members providing flow restricting orifices, said multi-stage orifice being so designed that the orifice of one of said strip-like members is oriented at a most upstream side with respect to the fluid flow and is effective in providing flow restriction for the steady flow, and the orifices of all of said strip-like members are equally effective for flow restriction for disturbed fluid flow.

8. A proportioning valve assembly as set forth in claim 7, which further comprises a third flow restricting means disposed in said fluid path at a position upstream of said first chamber, said third flow restricting means having a flow restriction characteristics to serve for first smaller flow restriction for steady fluid flow and a for second greater flow restriction for disturbed fluid flow.

9. A proportioning valve assembly as set forth in claim 8, wherein said third flow restricting means comprises a multi-stage orifice having a plurality of strip-like members providing flow restricting orifices, said multi-stage orifice being so designed that the orifice of one of said strip-like members oriented at a most upstream side with respect to the fluid flow is effective to provide flow restriction for the steady flow, and the orifices of all of said strip-like members are equally effective for flow restriction for disturbed fluid flow.

10. A proportioning valve assembly as set forth in claim 5, which further comprises a third flow restricting means disposed in said fluid path at a position upstream of said first chamber, said third flow restricting means having a flow restriction characteristics to serve for a first smaller flow restriction for steady fluid flow and for a second greater flow restriction for disturbed fluid flow.

11. A proportioning valve assembly as set forth in claim 10, wherein said third flow restricting means comprises a multi-stage orifice having a plurality of strip-like members providing flow restricting orifices, said multi-stage orifice being so designed that the orifice of one of said strip-like members is oriented at a most upstream side with respect to the fluid flow and is effective to provide flow restriction for the steady flow, and the orifices of all of said strip-like members are equally effective for flow restriction for the disturbed fluid flow.

12. A proportioning valve assembly as set forth in claim 5, which further comprises first and second spring means subjecting biasing forces for said one and the other ends of said first valve body for setting said first valve body at a position blocking fluid communication between said first, second and third ports when said pilot pressure and said feedback pressure balances.

13. A proportioning valve assembly as set forth in claim 5, which further comprises a fourth flow restricting means provided within said second port for restricting fluid flow therethrough, said fourth flow restricting means being providing a flow restriction characteristics for providing greatest flow restriction against switching frequency of a fluid flow direction substantially corresponding to a resonance frequency of said hydraulic cylinder.

14. A proportioning valve assembly as set forth in claim 5, which further comprises a fourth flow restricting means provided within said third port for restricting fluid flow therethrough, said third flow restricting means being providing a flow restriction characteristic for providing greatest flow restriction against switching frequency of the fluid flow direction substantially corresponding to the resonance frequency of said hydraulic cylinder.

15. An actively controlled suspension system comprising:
- a hydraulic cylinder disposed between a vehicular body and a suspension member rotatably supporting a vehicular wheel, said hydraulic cylinder defining an internal space with a piston disposed therein, said piston being attached to said vehiclar body and said suspension member via a piston rod, said piston being thrustingly received into a working chamber, said working chamber being variable of pressure for varying suspension characteristics;
- a hydraulic circuit connecting a pressurized working fluid source to said working chamber, said hydraulic circuit including a first line connected to an outlet of said pressurized working fluid source, a second line connected to an inlet of said pressurized working fluid source for returning working fluid therethrough, and a third line connected to said working chamber;
- a proportioning valve assembly disposed between a pressurized fluid source and an hydraulic cylinder for adjusting fluid pressure in a working chamber in said hydraulic cylinder, said proportioning valve assembly operating in a first mode in response to vibration energy for absorbing vibration energy for maintaining said fluid pressure in said working chamber and in a second mode for adjusting said fluid pressure in said working fluid for varying characteristics of said hydraulic cylinder, comprising:
  - a valve housing defining a first port connected to a pressurized working fluid source to receive pressurized working fluid therefrom, a second port connected to said pressurized working fluid source for returning the working fluid thereto, and a third port connected to a hydraulic cylinder for fluid communication therewith for adjusting working fluid pressure in said hydraulic cylinder;
  - a first valve means having one end facing a first chamber to be exerted a pilot pressure representative of a desired pressure in said hydraulic cylinder, and the other end facing a second chamber to be exerted a feedback pressure which is fed back from said third port, said first valve body being movable according to a pressure difference between said pilot pressure and said feedback pressure for selectively establishing fluid communication between said first, second and third ports of said valve housing, said first, second and third ports of said valve housing, said first valve body solely operative in response to a pressure difference between said pilot pressure and said feedback pressure for maintaining said fluid pressure in said working chamber constant at the pressure of said first chamber in said first mode;
  - a fluid path means defining a fluid path extending from said first port to said first chamber and from said first chamber to said second port;
  - a second valve means associated with said fluid path for providing flow restriction at a predetermined magnitude for generating said pilot pressure within said first chamber, said second valve means being operative in said second mode for adjusting said pilot pressure, and said second valve means including an electrically operable actuator means receiving a control signal to drive a valve member at a position corresponding to a value of said control signal for adjusting said pilot pressure at a pressure corresponding to said control signal value; and
  - an electric circuit means for supplying said control signal to said actuator of said second valve means, said electric circuit means including means for causing phase advance compensating lag in said first valve means in response to variations of said pilot pressure in said second mode operation;
  - an actuator associated with said second valve means for controlling position of said second valve means for adjusting said pilot pressure at a desired value; and
  - control means for monitoring vehicular attitude change of said vehicular body for producing a control signal depending upon monitored magnitude of attitude change for suppressing the attitude change, said control means supplying said control signal to said actuator for operating the latter to adjust the position of said second valve means.

16. An actively controlled suspension system as set forth in claim 15, wherein said second chamber of said valve housing is connected to said third port via a feedbsck chamber via a flow restricting orifice.

17. An actively controlled suspension system as set forth in claim 16, wherein said phase advancing means causes phase advance for copmpensating lag in said first valve means by said flow restricting orifice.

18. An actively controlled suspension system as set forth in claim 15, wherein said phase advancing means includes an input terminal to receive a signal representative of a target pilot pressure indicative signal and produces an output with advanced phase.

* * * * *